United States Patent
Combs et al.

(10) Patent No.: US 11,020,840 B2
(45) Date of Patent: Jun. 1, 2021

(54) GRIPPING SYSTEM WITH CLAMP DEVICE AND METHOD OF USING THE SAME

(71) Applicant: THE BOEING COMPANY, Chicago, IL (US)

(72) Inventors: Ashley Susan Combs, North Charleston, SC (US); Daniel Thomas, Summerville, SC (US)

(73) Assignee: THE BOEING COMPANY, Chicago, IL (US)

( * ) Notice: Subject to any disclaimer, the term of this patent is extended or adjusted under 35 U.S.C. 154(b) by 371 days.

(21) Appl. No.: 16/216,332

(22) Filed: Dec. 11, 2018

(65) Prior Publication Data

US 2020/0180116 A1    Jun. 11, 2020

(51) Int. Cl.
| | |
|---|---|
| *B25B 5/00* | (2006.01) |
| *B25B 5/10* | (2006.01) |
| *F16B 2/04* | (2006.01) |
| *B23Q 3/06* | (2006.01) |
| *B25B 5/16* | (2006.01) |
| *B25J 15/08* | (2006.01) |

(52) U.S. Cl.
CPC ............... *B25B 5/102* (2013.01); *B23Q 3/06* (2013.01); *B25B 5/163* (2013.01); *F16B 2/04* (2013.01); *B25J 15/08* (2013.01)

(58) Field of Classification Search
CPC .. B25B 5/00; B25B 5/006; B25B 5/10; B25B 1/00; B23Q 3/00; B23Q 3/06; B23Q 3/152; B23Q 3/154; B23Q 3/066
See application file for complete search history.

(56) References Cited

U.S. PATENT DOCUMENTS

| | | | |
|---|---|---|---|
| 4,333,330 A | 6/1982 | Porter | |
| 2009/0057019 A1* | 3/2009 | LaValley | ................. E21B 19/20 175/85 |
| 2016/0284968 A1* | 9/2016 | Miyazawa | ............. B25J 9/0087 |
| 2020/0180116 A1* | 6/2020 | Combs | ................. B25J 15/0047 |

* cited by examiner

*Primary Examiner* — Lee D Wilson
(74) *Attorney, Agent, or Firm* — Philip S. Hof; The Small Patent Law Group, LLC

(57) ABSTRACT

A gripping system for securing a work piece includes a clamp device, a rotary actuator, and a control circuit. The clamp device includes a ball screw mechanism and a jaw portion that has multiple grip fingers. The ball screw mechanism includes a shaft and a holder assembly. The shaft extends through the holder assembly and is configured for displacement along a central axis of the jaw portion. A distal tip of the shaft engages the grip fingers. The control circuit controls the rotary actuator to drive rotation of the shaft relative to the holder assembly, causing displacement of the shaft along the central axis. The displacement of the shaft causes the distal tip of the shaft to force the grip fingers to move in a radial direction away from the central axis to provide a clamp force on the work piece.

20 Claims, 5 Drawing Sheets

| Steps (1/200 of 1 revolution) | Ball Screw Displacement [in] | Diameter of Smaller Clamping Region [in] | Diameter of Larger Clamping Region [in] |
|---|---|---|---|
| 0 (Reference) | 0 | 0.8100 | 1.3100 |
| 10 | 0.0063 | 0.8155 | 1.3140 |
| 25 | 0.0156 | 0.8242 | 1.3201 |
| 35 | 0.0219 | 0.8300 | 1.3250 |
| 60 | 0.0375 | 0.8446 | 1.3360 |
| 75 | 0.0469 | 0.8533 | 1.3425 |
| 100 | 0.0625 | 0.8679 | 1.3534 |
| 112 | 0.0700 | 0.8749 | 1.3587 |

GRIPPING SYSTEM WITH CLAMP DEVICE AND METHOD OF USING THE SAME

FIELD OF THE DISCLOSURE

Embodiments of the present disclosure generally relate to clamping devices that releasably secure objects.

BACKGROUND

Mechanical clamp devices are utilized in various manufacturing and assembly applications to releasably secure (e.g., engage and hold) work pieces and other objects. For example, robotic arms of automated systems may have clamps at the end effectors for applying a clamp force on a work piece to hold and move the work piece. The clamp devices in manufacturing and assembly processes may be controlled to repeatably manipulate, such as grasp, move, and release, a multitude of consecutive work pieces. Over time during operation, small tolerances and/or errors may aggregate until eventually the clamp device damages one or more of the work pieces.

The small tolerances and/or errors may be attributable at least in part to backlash and/or slop in the mechanical linkage of the clamp device between the actuator that powers the clamp device and the jaws of the clamp device that engage the work pieces. Although an input force provided to the mechanical linkage by the actuator may remain constant for each gripping task on the work pieces in an assembly line, the clamp force exerted by the jaws of the clamp device may slightly vary due to backlash and/or slop, which either gradually increases or decreases the clamp force over time. If the clamp force decreases over time, the clamp device may eventually damage a work piece by dropping the work piece. On the other hand, if the clamp force increases over time, the clamp device may eventually damage a surface or material of the work piece, such as by cracking the surface. For example, small cracks and other defects in the surface of the work piece may be a concern for work pieces composed of composite materials. It may be difficult for a clamp device to maintain consistent and precise clamp forces over a multitude (e.g., hundreds or thousands) of repeatable gripping tasks.

SUMMARY OF THE DISCLOSURE

Certain embodiments of the present disclosure provide a gripping system for securing a work piece. The gripping system includes a clamp device, a rotary actuator, and a control circuit. The clamp device includes a body and a ball screw mechanism. The body defines a central axis. The body includes a jaw portion that has multiple grip fingers. The ball screw mechanism includes a shaft and a holder assembly. The holder assembly is secured in a fixed position to the body. The shaft extends through the holder assembly and is configured for displacement along the central axis of the body. A distal tip of the shaft engages the grip fingers of the jaw portion. The rotary actuator is connected to the shaft of the ball screw mechanism. The control circuit is communicatively connected to the rotary actuator. The control circuit is configured to control the rotary actuator to drive rotation of the shaft relative to the holder assembly, causing displacement of the shaft relative to the body along the central axis. The displacement of the shaft causes the distal tip of the shaft to force the grip fingers to move in a radial direction away from the central axis to provide a clamp force on the work piece.

Certain embodiments of the present disclosure provide a method for gripping a work piece. The method includes inserting a jaw portion of a clamp device into a hole of the work piece. The clamp device includes the jaw portion and a ball screw mechanism. The jaw portion has multiple grip fingers and defines a central axis. The ball screw mechanism includes a shaft and a holder assembly. The holder assembly is secured in a fixed position relative to the jaw portion. The shaft is connected to a rotary actuator and extends through the holder assembly. The shaft is configured for displacement along the central axis. A distal tip of the shaft engages the grip fingers. The method also includes controlling the rotary actuator, via one or more processors, to drive rotation of the shaft relative to the holder assembly while the jaw portion is within the hole of the work piece. The rotation of the shaft causes displacement of the shaft relative to the jaw portion, and the distal tip of the shaft forces the grip fingers to move in a radial direction away from the central axis to provide a clamp force on an inner surface that defines the hole of the work piece for securing the work piece to the clamp device.

Certain embodiments of the present disclosure provide a clamp device that includes a body and a ball screw mechanism. The body defines a central axis. The body includes a base portion and a jaw portion. The jaw portion has multiple grip fingers. The ball screw mechanism includes a shaft and a holder assembly. The holder assembly is mounted in a fixed position to the base portion of the body. The shaft extends through the holder assembly and is configured for linear displacement relative to the holder assembly. The shaft extends into the body and is coaxial with the central axis. A distal tip of the shaft engages interior surfaces of the grip fingers. Forced rotation of the shaft relative to the holder assembly causes linear displacement of the shaft relative to the body along the central axis, and the distal tip forces the grip fingers to move in a radial direction away from the central axis for engaging a work piece.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide a gripping system and method for engaging and manipulating work pieces and other objects. The work pieces may be components of an assembly, such as a vehicle or other machine. The gripping system may participate in the manufacturing and/or assembly of the work pieces to form the vehicle or other machine. In a non-limiting example, the gripping system may engage and manipulate work pieces that are components in the manufacture and assembly of aircraft. The gripping system is configured to engage consecutive work pieces with an accurate, precise, consistent, and repeatable amount of clamp force to avoid (or at least reduce the likelihood of) damaging the work pieces via dropping or by applying excessive force. The gripping system described herein may also have additional benefits over known clamps and clamping systems, such as less complexity and/or cost by eliminating or at least reducing the number of force sensors and computational feedback loops for monitoring the clamp force exerted on the work pieces.

Figure 1:
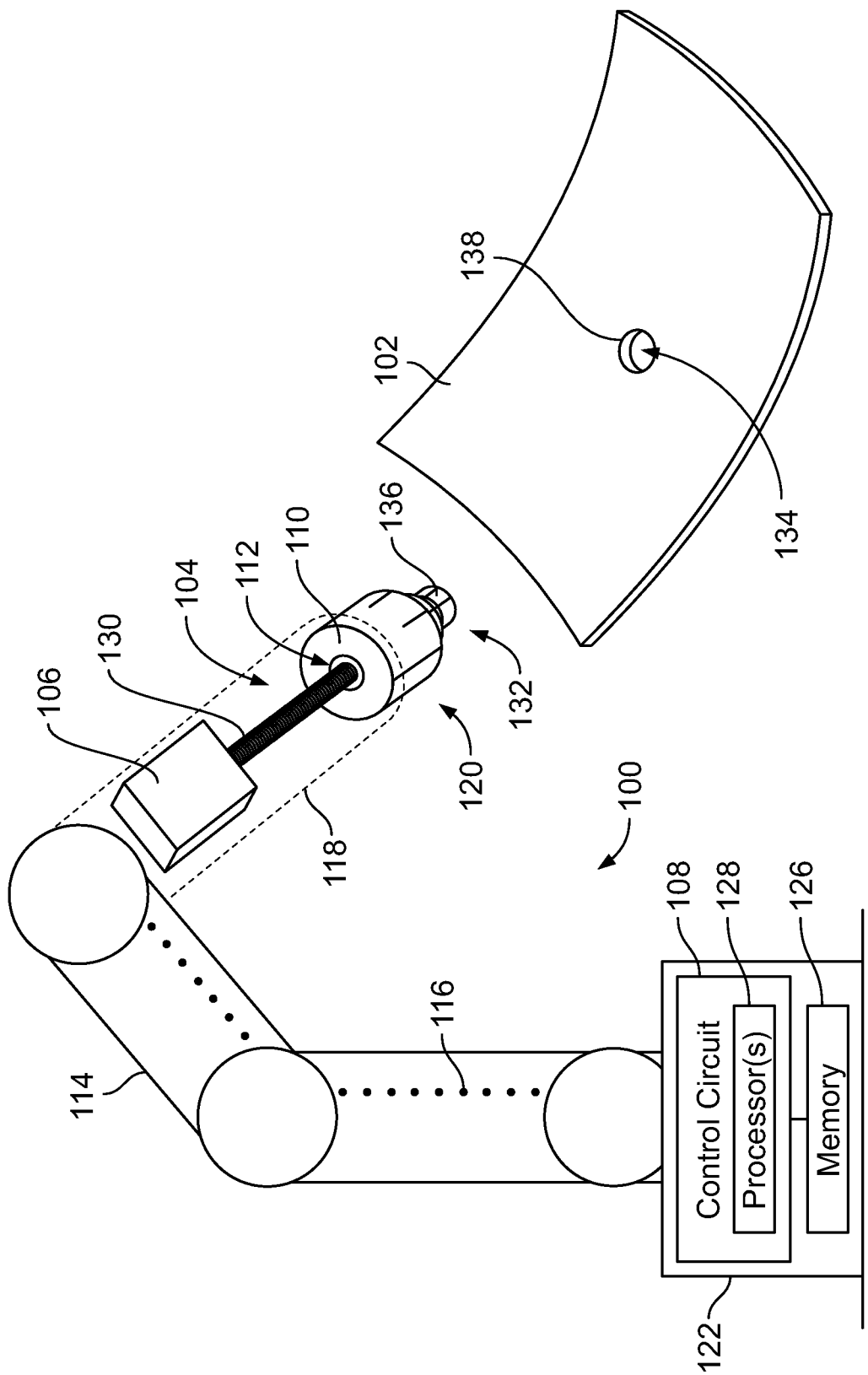
FIG. 1 illustrates a gripping system according to an embodiment and a work piece near the gripping system.

FIG. 1 illustrates a gripping system 100 according to an embodiment and a work piece 102 near the gripping system 100. The gripping system 100 includes a clamp device 104, a rotary actuator 106, and a control circuit 108. The clamp device 104 is configured to secure the work piece 102 by releasably engaging, gripping, and/or clamping the work piece 102. The clamp device 104 is mechanically connected to the rotary actuator 106, which powers the clamp device 104 to engage and release the work piece 102. The rotary actuator 106 is communicatively connected to the control circuit 108 via a wired or wireless communication link 116. The control circuit 108 communicates control signals to the rotary actuator 106 via the communication link 116 to control the action of the rotary actuator 106, and thereby control the action of the clamp device 104.

Optionally, the gripping system 100 may include or be incorporated into a robotic arm 114. For example, the clamp device 104 may be mounted on the robotic arm 114, and the robotic arm 114 may move the clamp device 104 relative to the work piece 102 to enable the clamp device 104 to engage and secure the work piece 102. While the work piece 102 is secured to the clamp device 104, the robotic arm 114 may move the clamp device 104 to move and manipulate the work piece 102. For example, the robotic arm 114 and clamp device 104 may be controlled to pick up and move the work piece 102 from a first position to a second position during a manufacturing and/or assembly process. Once in the second position, the robotic arm 114 and clamp device 104 may be controlled to hold the work piece 102 stationary while a task is performed on or with the work piece 102. For example, the robotic arm 114 and clamp device 104 may move a wing panel of an aircraft to a designated position relative to a wing of the aircraft to enable a worker (or another robotic arm) to mechanically affix the wing panel to the wing. The clamp device 104 is selectively controlled to release the work piece 102 to disconnect the robotic arm 114 from the work piece 102 and enable the clamp device 104 to engage another work piece.

The control circuit 108 includes one or more processors 128 and associated circuitry. For example, the control circuit 108 includes and/or represents one or more hardware circuits or circuitry that include, are connected with, or that both include and are connected with the one or more processors 128, controllers, and/or other hardware logic-based devices. The control circuit 108 may include a central processing unit (CPU), one or more microprocessors, a graphics processing unit (GPU), or any other electronic component capable of processing inputted data according to specific logical instructions.

The control circuit 108 may be operably connected to a memory storage device 126 (referred to herein as memory 126). The memory 126 is a tangible and non-transitory computer readable medium. The memory 126 may include or represent a flash memory, RAM, ROM, EEPROM, and/or the like. The control circuit 108 may execute programmed instructions stored on the memory 126 or stored on another tangible and non-transitory computer readable medium to control the clamp device 104 via the rotary actuator 106. The memory 126 may store look-up tables, charts, equations, work piece information, and/or calibration data that the control circuit 108 may access and utilize to control the operation of the clamp device 104 via the rotary actuator 106. For example, the control circuit 108 may access information stored in the memory 126 to determine how many steps or iterations of the rotary actuator 106 provides a desired or designated diameter of the clamp device 104 for securing the work piece 102.

In the illustrated embodiment, the components of the gripping system 100 are incorporated onto the robotic arm 114. For example, the clamp device 104 and the rotary actuator 106 may be mounted within or along an end-effector segment 118 of the robotic arm 114 that defines a distal end 120 of the robotic arm 114. The end-effector segment 118 is shown in phantom in FIG. 1 to show the underlying clamp device 104 and rotary actuator 106. In FIG. 1, the control circuit 108 and memory 126 are mounted on (or within) a stand 122 of the robotic arm 114 that structurally supports the robotic arm 114. The control circuit 108 and the memory 126 may be mounted at a different location along the robotic arm 114 in an alternative embodiment. Optionally, at least some of the components of the gripping system 100 may be separate and spaced apart from the robotic arm 114, such as the control circuit 108 and the memory 126. For example, the control circuit 108 and the memory 126 may be disposed within a separate computing device, and the control circuit 108 may communicate with the rotary actuator 106 via transmitting or broadcasting wireless control signals. It is recognized that the gripping system 100 described herein is not limited to use with robotic arms. For example, the gripping system 100 may be installed on a mechanical lift, a hand-held device configured to be carried by a human worker, or the like.

The clamp device 104 has a body (e.g., a clamp body) 110 and a ball screw mechanism 112. The ball screw mechanism 112 is mounted to the body 110. The ball screw mechanism 112 has a shaft 130 that is mechanically connected to the rotary actuator 106. The clamp device 104 has an engagement end 132 that engages the work piece 102.

In the illustrated embodiment, the body 110 of the clamp device 104 has a jaw portion 136 at the engagement end 132, and the jaw portion 136 is size and shaped to be inserted into a hole 134 of the work piece 102. For example, the outer surface of the jaw portion 136 of the body 110 may be cylindrical in shape and sufficiently narrow to be received into the hole 134. The jaw portion 136 engages an inner surface 138 of the work piece 102 that defines the hole 134 to secure the work piece 102. For example, a diameter of the jaw portion 136 is adjustable and is controlled by the control circuit 108 via the rotary actuator 106. The jaw portion 136 is inserted into the hole 134 while the jaw portion 136 defines a diameter that is less than the diameter of the hole 134 to allow for unobstructed insertion. After the jaw portion 136 is within the hole 134, the control circuit 108 controls the rotary actuator 106 to spread the jaw portion 136, increasing the diameter thereof until the jaw portion 136 engages the inner surface 138 of the work piece 102. The clamp device 104 secures the work piece 102 by providing an interference or friction fit between the jaw portion 136 of the body 110 and the inner surface 138 that defines the hole 134.

The rotary actuator 106 is a device that converts a power source into mechanical rotation to rotate the shaft 130 of the ball screw mechanism 112. For example, the rotary actuator 106 may be an electromagnetic device, such as a stepper motor or a servo motor, that converts electric current into mechanical rotation. The rotary actuator 106 may have a set number of steps (incremental angular rotations) or iterations per revolution. In a non-limiting example, the rotary actuator 106 may have hundreds of equal steps per revolution, such as 200. The control signals received from the control circuit 108 may command the rotary actuator 106 to turn a selected number of steps in order to achieve a desired or designated degree of rotation of the shaft 130, where rotation of the shaft 130 relative to the ball screw 112 results in a degree of linear displacement of the shaft 130, as described in more detail herein.

The gripping system 100 is designed to repeatably provide accurate jaw positioning and adjustment and precise clamp forces to prevent (or at least reduce the likelihood of) damaging the work piece 102 due to dropping or excessive force. For example, the gripping system 100 may exert sufficient force to reliably secure the work piece 102 without dropping, while maintaining the force below an excessive force threshold to prevent the inner surface 138 surrounding the hole 134 from fracturing, cracking, deforming, or the like. Because the gripping system 100 is able to provide consistent and precise clamp forces over a multiple of repeated work piece securing tasks, the gripping system 100 may be utilized to engage relatively fragile work pieces, or relatively fragile areas of non-fragile work pieces.

Figure 2:
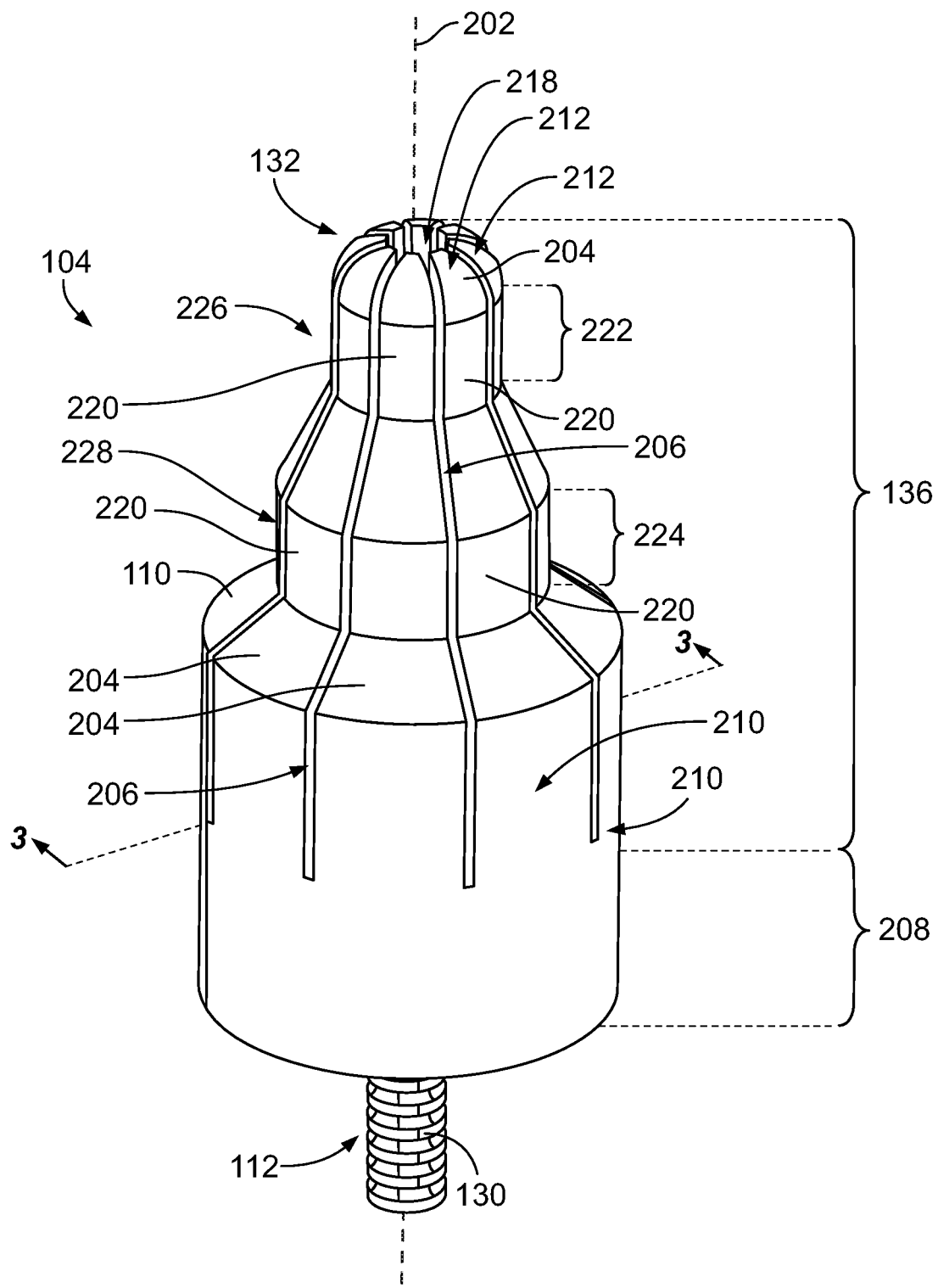
FIG. 2 is a perspective view of a clamp device of the gripping system according to an embodiment.

FIG. 2 is a perspective view of the clamp device 104 of the gripping system 100 (shown in FIG. 1) according to an embodiment. The body 110 defines a central axis 202. The jaw portion 136 of the body 110 has multiple grip fingers 204. The grip fingers 204 are spaced apart along a circumference of the body 110. The grip fingers 204 surround the central axis 202. Adjacent grip fingers 204 are separated from each other by a slit 206. The grip fingers 204 are separated from each other to allow the grip fingers 204 to spread apart. For example, the grip fingers 204 are able to move in a radial direction away from the central axis 202 and to inwardly move towards the central axis 202.

The body 110 includes a base portion 208 connected to the jaw portion 136. For example, the base portion 208 is located between the jaw portion 136 and the rotary actuator 106 (shown in FIG. 1) along the central axis 202. The jaw portion 136 extends from the base portion 208 to the engagement end 132 of the clamp device 104. In an embodiment, the body 110 has a unitary and monolithic structure. For example, the jaw portion 136 is formed integral to the base portion 208 such that there is no seam between the jaw portion 136 and the base portion 208.

The grip fingers 204 may be wedges or segments that are cantilevered. For example, each grip finger 204 has a fixed end 210 that is connected to the base portion 208. The base portion 208 has a cross-section establishing an area moment of inertia relative to which the grip finger 204 deflects in response to a force applied to the grip finger 204 at a given distance from the fixed end 210. The grip fingers 204 extend from the respective fixed end 210 to a respective free end 212 opposite the fixed end 210. The free ends 212 of the grip fingers 204 define the engagement end 132 of the clamp device 104. The grip fingers 204 are cantilevered because the grip fingers 204 are only secured at the fixed ends 210 thereof. The extent of deflection of the free end 212 of the cantilevered grip fingers 204 is a function of at least the area moment of inertia and the amount of force applied to the grip finger 204. A predetermined linear displacement of the shaft 130 causes a given extent of engagement between a distal tip 316 (shown in FIG. 3) of the shaft 130 and an interior surface 318 (FIG. 3) of the grip fingers 204, to apply a force for deflecting the grip fingers 204 radially outward to a predetermined diameter that may be correlated to the predetermined linear displacement of the shaft 130. In one exemplary embodiment, the grip fingers 204 preferably have a length of at least 2 inches, for example, and a fixed end 210 with a cross-sectional area that is about 0.1 $in^2$ and not more than a ratio of 0.250 square inches per inch of finger length, to enable resilient deflection of the grip fingers 204 without undesirable applied force by the distal tip 316 of the shaft 130 against the grip fingers 204. The slits 206 separate adjacent grip fingers 204 from each other along the lengths of the grip fingers 204 from the fixed ends 210 to the free ends 212. The free ends 212 are also spaced apart from each other. For example, the body 110 defines an interior channel 218 that is open at the engagement end 132. The free ends 212 of the grip fingers 204 surround and define the interior channel 218.

In an embodiment, the grip fingers 204 are configured to move relative to the central axis 202 by deflecting or bending. For example, the shaft 130 of the ball screw mechanism 112 exerts a force on the grip fingers 204 that may cause the grip fingers 204 to bend or deflect in a direction away from the central axis 202. The deflection of the grip fingers 204 increases a diameter of the jaw portion 136 for engaging and securing the work piece 102 (shown in FIG. 1). Optionally, the grip fingers 204 of the jaw portion 136 may be biased towards a rest position, which is the position of the grip fingers 204 shown in FIG. 2. The linear displacement of the shaft 130 of the ball screw mechanism 112 exerts a force on the grip fingers 204 to cause the grip fingers 204 to move outward away from the rest position. Once the force applied by the shaft 130 is removed, the grip fingers 204 may inwardly move (e.g., resiliently) towards the central axis 202 to attain the rest position.

The grip fingers 204 have engagement surfaces 220 that are configured to engage the inner surface 138 (shown in FIG. 1) of the work piece 102 that defines the hole 134. The engagement surfaces 220 are disposed along an outer or exterior surface of the grip fingers 204, facing away from the central axis 202. The engagement surfaces 220 define at least one clamping region. In the illustrated embodiment, the jaw portion 136 is tiered to include a first clamping region 222 and a second clamping region 224. The second clamping region 224 is disposed between the first clamping region 222 and the base portion 208. The first clamping region 222 is defined by a first set 226 of the engagement surfaces 220 of the grip fingers 204. The second clamping region 224 is defined by a second set 228 of the engagement surfaces 220.

Each of the first and second clamping regions 222, 224 is configured to engage the inner surface of a work piece defining a hole in the work piece. For example, both the first and second clamping regions 222, 224 may be cylindrical. The jaw portion 136 may be tapered along segments between the first and second clamping regions 222, 224 and outside of the first and second clamping regions 222, 224.

As shown in FIG. 2, the second clamping region 224 has a diameter along a plane perpendicular to the central axis 202 that is larger than a diameter of the first clamping region 222. The first clamping region 222 is configured secure to the inner surfaces of holes that have a first range of diameters, and the second clamping region 224 is configured to secure to the inner surfaces of larger holes that have a second range of diameters. The diameter of the first clamping region 222 shown in FIG. 2 may represent a first resting diameter, and the diameter of the second clamping region 224 represents a second resting diameter. The resting diameters may be attained when the grip fingers 204 are in the rest positions (e.g., are not deflected outward by the shaft 130). As the grip fingers 204 are forced to spread outward by linear displacement of the shaft 130, the diameter of the first clamping region 222 increases from the first resting diameter and the diameter of the second clamping region 224 increases from the second resting diameter. The first clamping region 222 has a first configurable range of diameters that spans from the first resting diameter to a first max diameter. In a non-limiting example, the first configurable range of diameters may extend from 0.8 in to 1.0 in. The second clamping region 224 has a second configurable range of diameters that spans from the second resting diameter to a second max diameter. In a non-limiting example, the second configurable range of diameters may extend from 1.3 in to 1.46 in. Therefore, the largest attainable diameter of the first clamping region 222 may be smaller than the smallest diameter of the second clamping region 224.

By including multiple tiers of clamping regions 222, 224 on the jaw portion 136, the clamp device 104 can be used for securing within a greater range of hole sizes than if the jaw portion 136 has only one clamping region. The multiple tiers may obviate the need to switch between multiple differently-sized bodies 110 and/or clamp devices 104 during a manufacturing and/or assembly task. In an alternative embodiment, the jaw portion 136 may have only one clamping region or may have three or more clamping regions.

Figure 3:
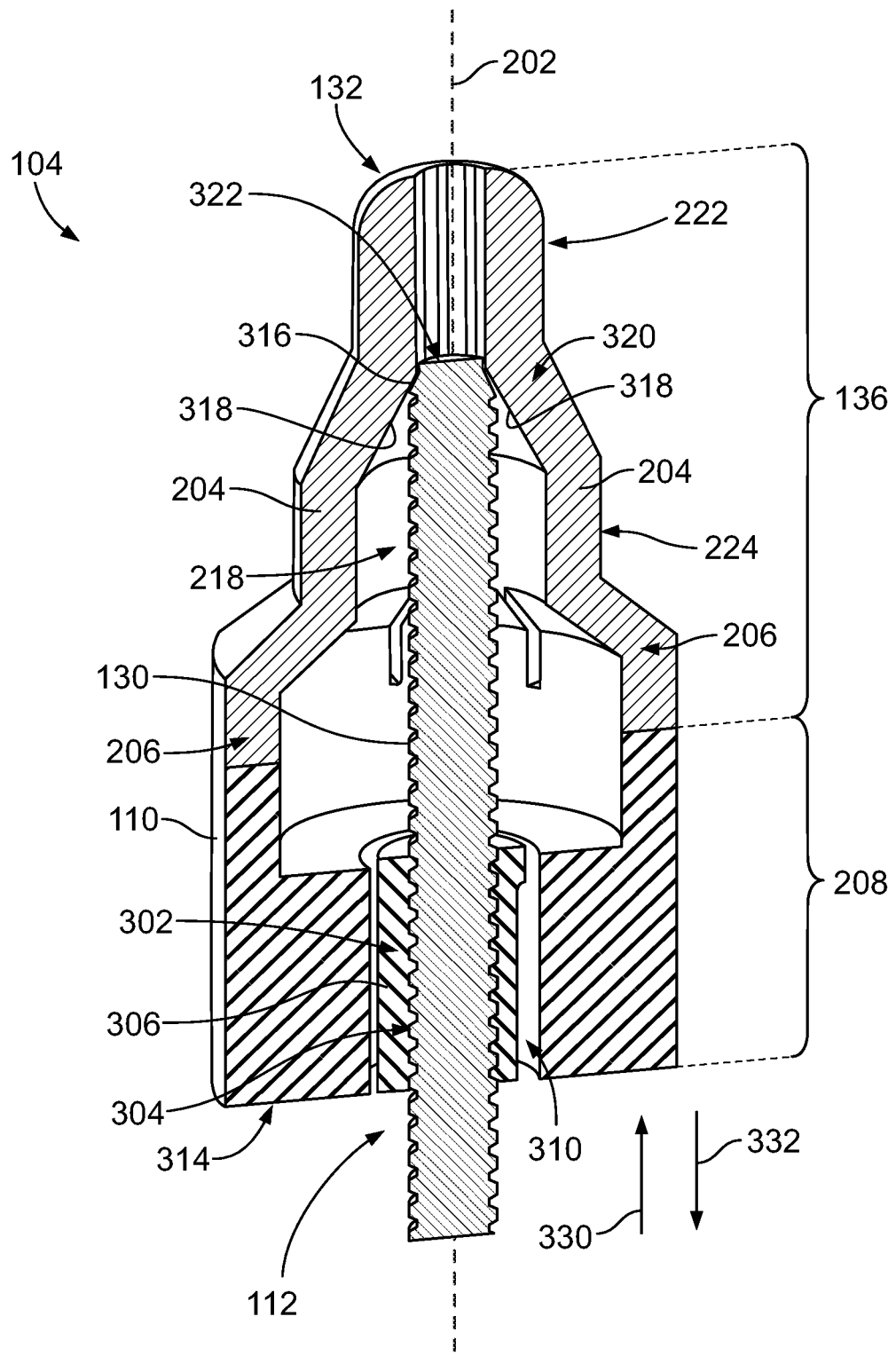
FIG. 3 is a cross-sectional view of the clamp device taken along line 3-3 in FIG. 2.

FIG. 3 is a cross-sectional view of the clamp device 104 taken along line 3-3 in FIG. 2. The line 3-3 extends through two slits 206, so only the base portion 208 of the body 110 is sectioned (e.g., not the jaw portion 136). The ball screw mechanism 112 of the clamp device 104 includes the shaft 130 and a holder assembly 302. The shaft 130 extends through a bore 304 of the holder assembly 302. The holder assembly 302 is secured in a fixed position to the body 110. For example, in FIG. 3 the holder assembly 302 is mounted to the base portion 208. The holder assembly 302 includes a housing 306 and ball bearings 308 (shown in FIG. 5) that are held within the housing 306. The ball bearings 308 engage the shaft 130 to mechanically connect the shaft 130 to the holder assembly 302. In the illustrated embodiment, the housing 306 is held within a cylindrical cavity 310 of the base portion 208 of the body 110. The housing 306 is secured to the body 110 within the cavity 310 via one or more fasteners (e.g., bolts, nuts, etc.), clips, adhesives, a threaded connection, an interference fit, or the like. The housing 306 may be rotationally fixed to the body 110 such that the housing 306 does not rotate about the central axis 202 relative to the body 110.

The shaft 130 of the ball screw mechanism 112 is coaxial to the central axis 202. The shaft 130 extends across an actuator end 314 of the body 110 (which faces towards the rotary actuator 106 shown in FIG. 1) and into the interior channel 218 of the body 110. The distal tip 316 of the shaft 130 within the interior channel 218 engages interior surfaces 318 of the grip fingers 204. The distal tip 316 refers to a length of the shaft 130 which may or may not extend fully to an end 322 of the shaft 130. The interior surfaces 318 of the grip fingers 204 face towards the central axis 202 and may define a perimeter of the interior channel 218. In the illustrated embodiment, the distal tip 316 of the shaft 130 engages the interior surfaces 318 of the grip fingers 204 along a tapered region 320 of the grip fingers 204 that is between the first and second clamping regions 222, 224. In the tapered region, the interior surfaces 318 of the grip fingers 204 are at an angle that is preferably less than about 45 degrees relative to the central axis 202, where an angle greater than 45 degrees results in an incremental displacement of the distal tip 316 of the shaft 130 causing excessive outward deflection that hinders precise control of the diameter of the clamping regions 222, 224. In a non-limiting example, the interior surfaces 318 are at an angle of about 25 degrees relative to the axis 202. In the tapered region, the interior surfaces 318 of the grip fingers 204 form the interior channel 218 having an inside diameter that is at least 0.050 inches smaller than the diameter of the shaft 130, such that the inside diameter of the tapered region 320 of the grip fingers 204 may expand to the diameter of the shaft 130 to provide a sufficient range of outward deflection of the grip fingers 204 for adjustment of the diameter of the clamping regions 222, 224. In an alternative embodiment, the distal tip 316 may engage the interior surfaces 318 of the grip fingers 204 outside of the tapered region 320. Although the distal tip 316 of the shaft 130 that engages the interior surfaces 318 is located at the end 322 of the shaft 130 in the illustrated embodiment, but it is understood that the distal tip 316 may be spaced apart from the end 322 in another embodiment. For example, the distal tip 316 may be tapered, stepped, or contoured, and the portion of the distal tip 316 that engages the interior surfaces 318 may be at least slightly spaced apart from the end 322.

The clamp device 104 operates based on forced rotation of the shaft 130. For example, the shaft 130 may be rotated by the rotary actuator 106 (shown in FIG. 1). Rotation of the shaft 130 relative to the holder assembly 302 of the ball screw mechanism 112 causes linear displacement of the shaft 130 relative to both the holder assembly 302 and the body 110. For example, rotation of the shaft 130 in one direction (e.g., clockwise) may cause linear displacement of the shaft 130 in a direction 330 towards the engagement end 132, and rotation in the opposite direction (e.g., counter-clockwise) may cause linear displacement in the opposite direction 332 (e.g., towards the actuator 106). The linear displacement of the shaft 130 in the direction 330 causes the distal tip 316 to engage the interior surfaces 318 of the grip fingers 204 and force the grip fingers 204 to be deflected radially outward away from the central axis 202. The outward radial deflection of the grip fingers 204 spreads apart the grip fingers 204 and increases the diameters of both clamping regions 222, 224. The multiple grip fingers 204 may have a uniform thickness and material composition (relative to one another) to enable consistent deflection among the grip fingers 204 in response to the force exerted by the shaft 130. Accordingly, the rotary actuator 106 turning a predetermined number of steps causes an extent of rotation of the shaft 130 that results in a predetermined linear displacement of the shaft 130 and engagement between the distal tip 316 of the shaft 130 and the interior surfaces 318 of the grip fingers 204, to apply a force for deflecting the grip fingers 204 radially outward to a predetermined diameter that may be correlated to the predetermined number of steps for turning the shaft 130. Rotation of the shaft 130 in the opposite direction to cause the shaft 130 to move in the direction 332 reduces and/or eliminates the force exerted on the grip fingers 204 by the distal tip 316 of the shaft 130, which allows the biased grip fingers 204 to move inward towards the resting position, reducing the diameters of both clamping regions 222, 224.

Figure 4:
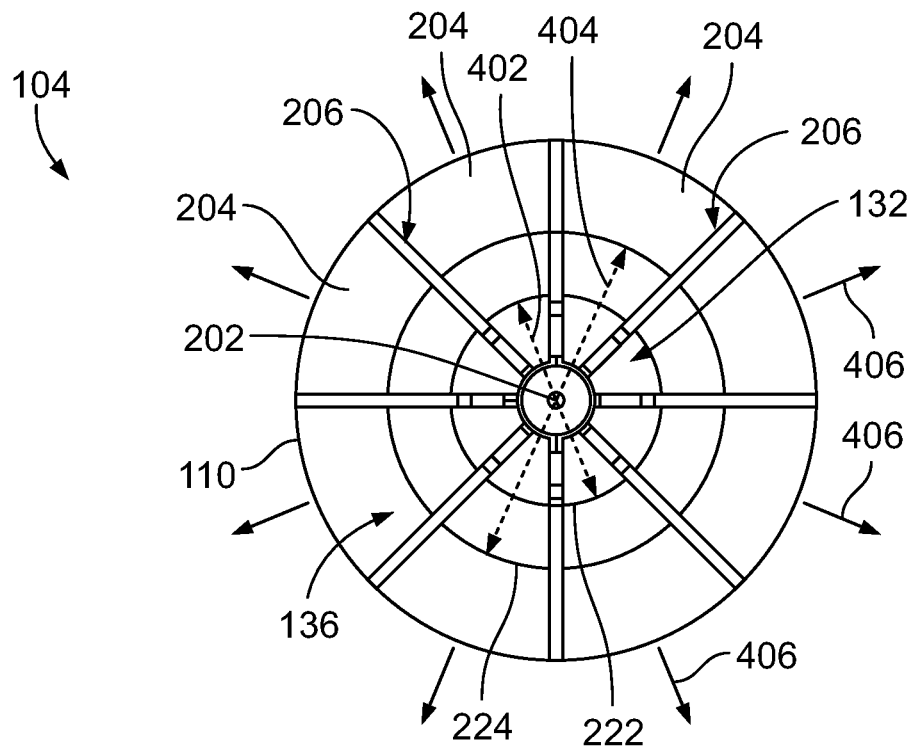
FIG. 4 is an end view of the clamp device showing an engagement end thereof.

FIG. 4 is an end view of the clamp device 104 showing the engagement end 132 thereof. The view in FIG. 4 is taken along the central axis 202, which is shown as a point. In the illustrated embodiment, the grip fingers 204 of the body 110 are arranged circumferentially around the central axis 202. The grip fingers 204 resemble triangular wedges that are separated by the slits 206. When forced by the shaft 130 (shown in FIG. 3), the grip fingers 204 deflect in radial directions 406 away from the central axis 202. FIG. 4 also shows how the jaw portion 136 of the body 110 is tiered. For example, FIG. 4 shows the first resting diameter 402 defined by the first clamping region 222, and the second resting diameter 404 defined by the second clamping region 224. Although the jaw portion 136 of the body 110 includes eight grip fingers 204 in the illustrated embodiment, the jaw portion 136 may have more or less than eight grip fingers 204 in other embodiments. In some non-limiting examples, the jaw portion 136 may have two, four, five, six, or ten grip fingers 204 distributed around the central axis 202.

Figure 5:
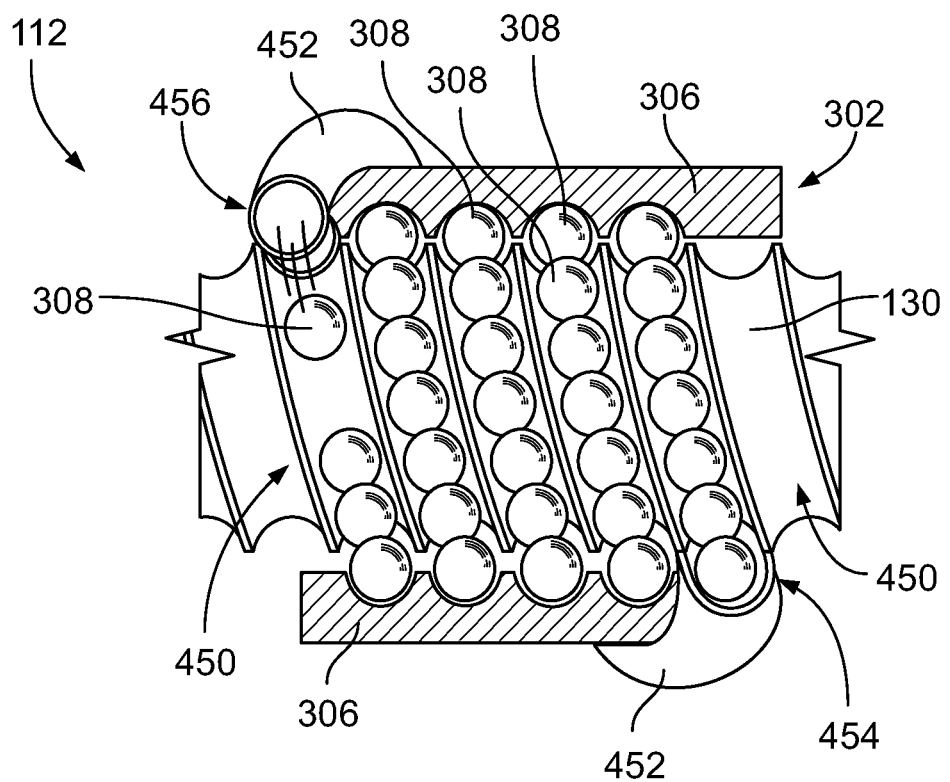
FIG. 5 is a partial cross-section of a ball screw mechanism of the clamp device according to an embodiment.

FIG. 5 is a partial cross-section of the ball screw mechanism 112 of the clamp device 104 according to an embodiment. The housing 306 of the holder assembly 302 is shown in cross-section in FIG. 5 to show the ball bearings 308 held within the housing 306. The shaft 130 defines helical raceways 450 that receive the ball bearings 308 therein. The helical raceways 450 are sized to allow the ball bearings 308 to roll along the raceways 450. The shaft 130 is indirectly mechanically connected to the housing 306 via the ball bearings 308. The holder assembly 302 also includes a return chute 452 to provide a closed path for recirculating the ball bearings 308. For example, the return chute 452 in FIG. 5 conveys the ball bearings 308 from one end 454 of the housing 306 to an opposite, second end 456. The ball bearings 308 may be greased. The ball bearings 308 may be under a preload, which may effectively eliminate backlash and/or slop between input rotation and output linear displacement.

Referring now back to FIGS. 1 and 3, the control circuit 108 is configured to control the clamp device 104 via the rotary actuator 106 to releasably grip and secure the work piece 102. For example, before the engagement end 132 of the clamp device 104 is inserted into the hole 134 of the work piece 102, the control circuit 108 may control the grip fingers 204 to attain the rest position. In the rest position, the grip fingers 204 define a small initial diameter to reduce the likelihood of stubbing against the edge of the hole 134 as the engagement end 132 is inserted into the hole 134. The control circuit 108 may ensure that the grip fingers 204 attain the rest position by commanding the rotary actuator 106 to move to a designated reference position. When the rotary actuator 106 is in the reference position, the shaft 130 is in a linear position in which the distal tip 316 of the shaft 130 does not force the grip fingers 204 to deflect outward. While the engagement end 132 of the clamp device 104 is in position within the hole 134 such that one of the two clamping regions 222, 224 of the jaw portion 136 align with the inner surface 138 of the work piece 102 defining the hole 134, the control circuit 108 commands the rotary actuator 106 to move a predetermined number of steps. The movement of the rotary actuator 106 rotates the shaft 130 relative to the holder assembly 302, causing linear displacement of the shaft 130 relative to the body 110 which drives the distal tip 316 of the shaft 130 to force the grip fingers 204 to deflect outward, increasing the diameter of the clamping regions 222, 224 until the engagement surfaces 220 of the grip fingers 204 abut against the inner surface 138 of the work piece 102.

Attributable at least in part to the tight tolerances of the ball screw mechanism 112, the gripping system 100 is able to provide consistent and precise clamp forces on a multitude of work pieces. For example, the control circuit 108 controls the rotary actuator 106 to move the predetermined number of steps based on a known diameter of the jaw portion 136, and a known force exerted on the inner surface 138 of the work piece 102, responsive to the rotary actuator 106 moving the predetermined number of steps. For example, the memory 126 may store a look-up table, a function or equation, a calibration constant, or the like, that allows the control circuit 108 to determine the diameters of the two tiers of clamping regions 222, 224 based on the positioning of the rotary actuator 106.

Figures 6, 7:
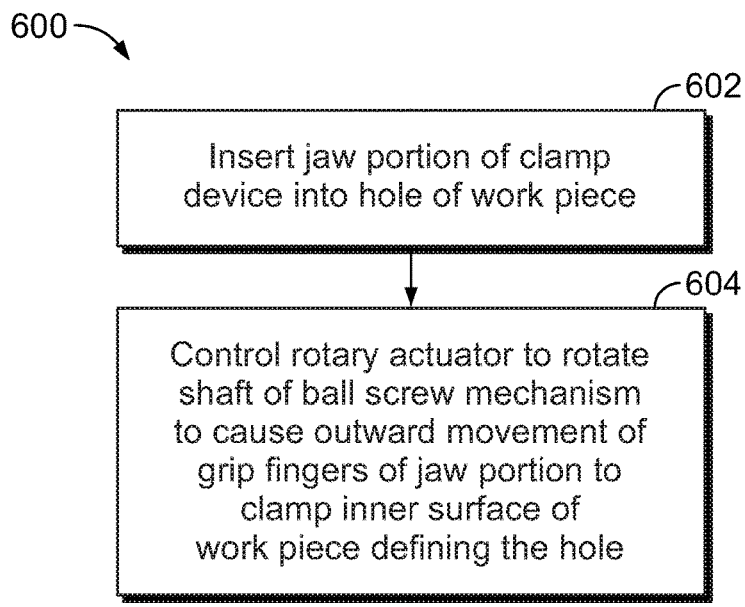
FIG. 6 is a table illustrating the relationship between the diameters of two clamping regions and the positioning of the rotary actuator according to an embodiment.
FIG. 7 is a flow chart of a method for gripping a work piece according to an embodiment of the present disclosure.

FIG. 6 is a table 500 illustrating the relationship between the diameters of the two clamping regions 222, 224 and the positioning of the rotary actuator 106 according to an embodiment. The table 500 includes a step column 502 that represents the positioning of the rotary actuator 106. In the table 500, it is assumed that each step of the rotary actuator 106 is one two-hundredth (e.g., 1/200) of a full revolution, such that each successive step moves 1.8 degrees. The values within the cells 504 of the step column 502 are input variables. The table 500 also includes a ball screw displacement column 506 which represents the linear displacement of the shaft 130 responsive to the number of steps of the rotary actuator 106 from a reference position of the rotary actuator 106. The table 500 also includes a smaller clamping region diameter column 508 and a larger clamping region diameter column 510 which represent the diameters of the first and second clamping regions 222, 224, respectively. FIG. 6 illustrates the correlation between turning a predetermined number of steps (resulting in a predetermined linear displacement of the shaft 130) and deflection of the grip fingers 204 radially outward to a predetermined diameter of the clamping regions 222, 224 for accurate and repeatable gripping of a work piece 102.

As shown in the table 500, the diameters of the clamping regions 222, 224 increase in proportion to an increasing number of steps of the rotary actuator 106. For example, in a first row 512, the rotary actuator 106 is at a reference position referred to as "0" steps. The shaft 130 is also at a reference position and has no linear displacement. The diameter of the smaller clamping region 222 is 0.81 in (2.057 cm), and the diameter of the larger clamping region 224 is 1.31 in (3.27 cm). In a second row 513, the rotary actuator 106 is at step 10, which causes linear displacement of the screw thread or groove of the shaft 130 by 0.0063 in (0.0160 cm). The linear displacement of the screw thread or groove of the shaft 130 depends on the rotation of the actuator 106 as well as the lead of the shaft 130, which is the axial length of one revolution of a given thread or groove. For each incremental rotation step of the rotary actuator 106 that causes an incremental rotation of the shaft 130, the incremental rotation of the shaft 130 causes a known, accurate incremental linear displacement of the shaft 130 along the shaft's axis. A ratio of the incremental rotation to a full rotation corresponds to a ratio of the incremental linear displacement relative to the axial length of one revolution of a given thread or groove of the ball screw shaft 130. In an exemplary embodiment, the axial length of one revolution of a given thread or groove of the ball screw shaft 130 may be 0.125 inches, for example. This displacement of the shaft 130 (e.g., of 0.0063 in) causes the distal tip 316 of the shaft 130 to engage with the jaw portion 136 and force the jaw fingers 204 to expand, which results in an increase in both clamping region diameters to 0.8155 in (2.0714 cm) and 1.314 in (3.3376 cm), respectively. Therefore, movement of the rotary actuator 106 by ten steps increases the diameters of the clamping regions 222, 224 by a few thousandths of an inch. The table 500 illustrates that the gripping system 100 is able to achieve very accurate and precise diameters of the two clamping regions 222, 224 by selecting the number of steps of the rotary actuator 106 from the reference position.

In a non-limiting example, if it is known that the diameter of the hole 134 of the work piece 102 is 1.3249 in, then the control circuit 108 may access the table 500 (or a function used to generate the data in the table 500 or a function derived based on the data in the table 500) to determine how to control the clamp device 104 via the rotary actuator 106 to secure the work piece 102. As shown in a fourth row 514 of the table 500, 35 steps of the actuator 106 causes the larger clamping region 224 to achieve a diameter of 1.325 in (3.3655 cm). The control circuit 108 may transmit a control signal to the robotic arm 114 to move such that the larger clamping region 224 is aligned with the inner surface 138 of the work piece 102 defining the hole 134. Then the control circuit 108 may transmit a control signal to the rotary actuator 106 commanding that the actuator 106 move 35 steps. Optionally, if it is determined that 35 steps may exert excessive force that risks damaging the inner surface 138, via cracks, fractures, or the like, the control circuit 108 may control the actuator 106 to move only 34 steps instead of 35 steps. The movement of the actuator 106 causes the clamping region 224 to grip and clamp onto the inner surface 138 without damaging the work piece 102. Once secured to the clamp device 104, the robotic arm 114 may move the work piece 102 or hold the work piece 102 stationary depending on a given task.

In addition to providing precise, accurate, and repeatable diameters to control and maintain consistent clamp forces exerted on the work pieces 102, the gripping system 100 may also be less costly and/or complex than some known automated clamping systems. For example, some known automated clamping systems rely on various sensors, such as force sensors, position sensors, and the like, which monitor the operation of the clamp device. The sensors may be connected to a control unit to form various feedback loops. If a force sensor determines that the force exerted on a work piece exceeds a designated threshold, the control unit may modify the output control signal based on the feedback received from the force sensor. These known automated clamping systems may be costly and complex due to the component costs, and also may be costly and complex due to the computational strain of processing the information from various feedback loops. In one or more embodiments, the control circuit 108 of the gripping system 100 described herein is configured to control the clamp device 104 via the rotary actuator 106 independent of feedback from a sensor. For example, the control circuit 108 may utilize a look-up table, such as the table 500 shown in FIG. 6, to control the operation of the clamp device 104, but does not utilize force measurements from a force sensor.

FIG. 7 is a flow chart of a method 600 for gripping or securing a work piece according to an embodiment. The method 600 may represent at least some of the operations performed by the control circuit 108, including the one or more processors 128 thereof, of the gripping system 100 shown in FIG. 1. The method 600 may represent an algorithm used to create (e.g., write) one or more software applications that direct operation of one or more processors 128 of the control circuit 108. The method 600 may include additional steps, fewer steps, and/or different steps than the illustrated flowchart in FIG. 7 in an alternative embodiment.

Referring to FIGS. 1-6, the method 600 begins at 602, at which a jaw portion 136 of a clamp device 104 is inserted into a hole 134 of a work piece 102. The jaw portion 136 may be inserted into the hole 134 by controlling movement of a robotic arm 114 onto which the clamp device 104 is mounted. At 604, a rotary actuator 106 is controlled to rotate a shaft 130 of a ball screw mechanism 112 of the clamp device 104. The rotation of the shaft 130 causes linear displacement of the shaft 130 relative to a body 110 of the clamp device 104. Due to the linear displacement, a distal tip 316 of the shaft 130 forces grip fingers 204 of the jaw portion 136 to move outward away from a central axis 202, which increases a diameter defined by the grip fingers 204. Due to the enlarged diameter, engagement surfaces 220 of the grip fingers 204 abut against and exert a clamp force on an inner surface 138 of the work piece 102, which is the surface surrounding and defining the hole 134. The clamp force exerted on the inner surface 138 enables the clamp device 104 to grip and secure the work piece 102.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A gripping system for securing a work piece, the gripping system comprising:
a clamp device including a body and a ball screw mechanism, the body defining a central axis, the body including a jaw portion that has multiple grip fingers, the ball screw mechanism including a shaft and a holder assembly, the holder assembly secured in a fixed position to the body, the shaft extending through the holder assembly and configured for displacement along the central axis of the body, a distal tip of the shaft engaging the grip fingers of the jaw portion;
a rotary actuator connected to the shaft of the ball screw mechanism; and
a control circuit communicatively connected to the rotary actuator, wherein the control circuit is configured to control the rotary actuator to drive rotation of the shaft relative to the holder assembly causing displacement of the shaft relative to the body along the central axis, wherein the displacement of the shaft causes the distal tip of the shaft to force the grip fingers to move in a radial direction away from the central axis to provide a clamp force on the work piece.

2. The gripping system of claim 1, wherein the jaw portion of the body is cylindrical and is configured to be inserted into a hole of the work piece, and wherein the control circuit is configured to control the rotary actuator to drive rotation of the shaft while the jaw portion is within the hole of the work piece to force the grip fingers of the jaw portion to move in the radial direction away from the central axis until respective engagement surfaces of the grip fingers engage an inner surface that defines the hole to secure the work piece to the clamp device.

3. The gripping system of claim 1, wherein the rotary actuator has a set number of steps per revolution, and the control circuit is configured to control the rotary actuator to rotate a predetermined number of the steps to force the grip fingers of the jaw portion to move in the radial direction away from the central axis until respective engagement surfaces of the grip fingers define a designated outer diameter for engaging the work piece.

4. The gripping system of claim 1, wherein the control circuit is configured to control the rotary actuator to drive rotation of the shaft independent of feedback from a sensor.

5. The gripping system of claim 1, wherein the grip fingers of the jaw portion are arranged circumferentially around the central axis and adjacent grip fingers are separated by slits, the grip fingers configured to radially deflect relative to the central axis.

6. The gripping system of claim 1, wherein the jaw portion of the body includes a first clamping region and a second clamping region, the second clamping region disposed between the first clamping region and a base portion of the body along the central axis, the first clamping region defined by a first set of engagement surfaces of the grip fingers and having a first configurable range of diameters, the second clamping region defined by a second set of engagement surfaces of the grip fingers and having a second configurable range of diameters that has greater diameter sizes than the first configurable range of diameters.

7. The gripping system of claim 1, wherein the holder assembly of the ball screw mechanism is mounted to a base portion of the body, the base portion connected to the jaw portion.

8. The gripping system of claim 1, wherein the holder assembly of the ball screw mechanism includes a housing and ball bearings held within the housing, wherein the shaft of the ball screw mechanism defines helical raceways that receive the ball bearings therein to mechanically connect the shaft to the holder assembly.

9. The gripping system of claim 1, wherein the shaft of the ball screw mechanism extends into an interior channel of the body and is coaxial with the central axis, the distal tip of the shaft engaging interior surfaces of the grip fingers that face towards the central axis.

10. The gripping system of claim 1, wherein the clamp device is mounted on a robotic arm.

11. A method for gripping a work piece, the method comprising:
inserting a jaw portion of a clamp device into a hole of the work piece, the clamp device including the jaw portion and a ball screw mechanism, the jaw portion having multiple grip fingers and defining a central axis, the ball screw mechanism including a shaft and a holder assembly, the holder assembly secured in a fixed position relative to the jaw portion, the shaft connected to a rotary actuator and extending through the holder assembly, the shaft configured for displacement along the central axis, a distal tip of the shaft engaging the grip fingers; and
controlling the rotary actuator, via one or more processors, to drive rotation of the shaft relative to the holder assembly while the jaw portion is within the hole of the work piece, wherein the rotation of the shaft causes displacement of the shaft relative to the jaw portion and the distal tip of the shaft forces the grip fingers to move in a radial direction away from the central axis to provide a clamp force on an inner surface that defines the hole of the work piece for securing the work piece to the clamp device.

12. The method of claim 11, wherein the rotary actuator has a set number of steps per revolution, and the rotary actuator is controlled to rotate a predetermined number of the steps to force the grip fingers of the jaw portion to move in the radial direction away from the central axis until respective engagement surfaces of the grip fingers define a designated outer diameter for engaging the inner surface of the work piece that defines the hole.

13. The method of claim 11, wherein the rotary actuator is controlled to drive rotation of the shaft independent of feedback from a sensor.

14. The method of claim 11, wherein the clamp device is mounted on a robotic arm, and the method further comprises controlling the robotic arm to change positions of the clamp device while the work piece is secured to the clamp device via the clamp force provided by the grip fingers of the jaw portion on the inner surface of the work piece to move the work piece.

15. The method of claim 11, wherein the rotary actuator is controlled to drive rotation of the shaft in a first direction relative to the holder assembly to cause the grip fingers to provide the clamp force on the inner surface of the work piece, and the method further comprises controlling the rotary actuator to drive rotation of the shaft in an opposite, second direction relative to the holder assembly to cause the grip fingers to inwardly move towards the central axis and release the clamp force on the inner surface of the work piece.

16. A clamp device comprising:
   a body defining a central axis, the body including a base portion and a jaw portion, the jaw portion having multiple grip fingers; and
   a ball screw mechanism including a shaft and a holder assembly, the holder assembly mounted in a fixed position to the base portion of the body, the shaft extending through the holder assembly and configured for linear displacement relative to the holder assembly, wherein the shaft extends into the body and is coaxial with the central axis, a distal tip of the shaft engaging interior surfaces of the grip fingers,
   wherein forced rotation of the shaft relative to the holder assembly causes linear displacement of the shaft relative to the body along the central axis, and the distal tip forces the grip fingers to move in a radial direction away from the central axis for engaging a work piece.

17. The clamp device of claim 16, wherein the grip fingers of the jaw portion are arranged circumferentially around the central axis and adjacent grip fingers are separated by slits, the grip fingers configured to radially deflect relative to the central axis responsive to the force exerted on the interior surfaces of the grip fingers by the distal tip of the shaft.

18. The clamp device of claim 16, wherein the jaw portion of the body includes a first clamping region and a second clamping region, the second clamping region disposed between the first clamping region and the base portion of the body along the central axis, the first clamping region having a first resting diameter, the second clamping region having a second resting diameter that is larger than the first resting diameter.

19. The clamp device of claim 16, wherein the holder assembly of the ball screw mechanism includes a housing and ball bearings held within the housing, wherein the shaft of the ball screw mechanism defines helical raceways that receive the ball bearings therein to mechanically connect the shaft to the holder assembly.

20. The clamp device of claim 16, wherein the body has a unitary, monolithic structure.

* * * * *